United States Patent
Kamel

(10) Patent No.: US 7,185,221 B1
(45) Date of Patent: Feb. 27, 2007

(54) METHOD AND SYSTEM FOR SIGNALING A SYSTEM FAULT

(75) Inventor: Wael Kamel, Mountain View, CA (US)

(73) Assignee: Cisco Technologies, Inc., San Jose, CA (US)

( * ) Notice: Subject to any disclaimer, the term of this patent is extended or adjusted under 35 U.S.C. 154(b) by 629 days.

(21) Appl. No.: 10/187,882

(22) Filed: Jul. 1, 2002

(51) Int. Cl.
*G06F 11/00* (2006.01)

(52) U.S. Cl. .......................................... 714/4

(58) Field of Classification Search ................. 714/43, 714/57, 4; 709/223
See application file for complete search history.

(56) References Cited

U.S. PATENT DOCUMENTS

| | | | | |
|---|---|---|---|---|
| 5,321,838 A | * | 6/1994 | Hensley et al. | 717/125 |
| 5,335,432 A | * | 8/1994 | Simpson | 38/106 |
| 5,564,429 A | * | 10/1996 | Bornn et al. | 600/508 |
| 6,145,101 A | * | 11/2000 | Pike | 714/46 |
| 6,334,193 B1 | * | 12/2001 | Buzsaki | 714/2 |
| 6,711,154 B1 | * | 3/2004 | O'Neal | 370/352 |
| 6,804,796 B2 | * | 10/2004 | Gustavsson et al. | 714/38 |
| 6,829,478 B1 | * | 12/2004 | Layton et al. | 455/428 |
| 6,963,993 B1 | * | 11/2005 | Semancik et al. | 714/2 |
| 2001/0012286 A1 | * | 8/2001 | Huna et al. | 370/352 |
| 2002/0041289 A1 | * | 4/2002 | Hatch et al. | 345/762 |
| 2003/0084349 A1 | * | 5/2003 | Friedrichs et al. | 713/201 |

* cited by examiner

*Primary Examiner*—Bryce P. Bonzo
(74) *Attorney, Agent, or Firm*—Marger Johnson & McCollom, PC

(57) ABSTRACT

A method and system for signaling a system fault. In one method embodiment, the present invention receives an error advisory pertaining to a fault within a network. Next, the present invention selects a pre-programmed alert message from a database based on the error advisory, wherein the pre-programmed alert message is selected from a number of pre-programmed alert messages stored in the database. The present invention then transmits the pre-programmed alert message to a communications device.

30 Claims, 6 Drawing Sheets

Table 105

| Alert Message 110 | | Contact Info 120 | | |
|---|---|---|---|---|
| Time of Day 410 | Error Type 420 | Message 430 | Communications Device 440 | # of Retries 450 | Duration 460 |
| 00:00 | 1 2 | | | | |
| 01:00 | 1 2 | | | | |
| 02:00 | 1 2 | | | | |
| | | | | | |
| 23:00 | 1 2 | | | | |

Fig. 4

METHOD AND SYSTEM FOR SIGNALING A SYSTEM FAULT

FIELD OF THE INVENTION

The present claimed invention relates to the field of computer network fault detection. Specifically, the present claimed invention relates to a method and system for signaling a system fault.

BACKGROUND ART

A network is a system that transmits any combination of voice, video, and data between users. A network includes the operating system (OS), the cables coupling them, and all supporting hardware such as bridges, routers, and switches. In today's market, there are many types of networks. For example, there are communications networks and there are telephone switching system networks. In general, a network is made up of at least one server, a workstation, a network operating system, and a communications link.

Presently, networks such as these can be found in almost all aspects of modern life. They are used both at home and in the workplace. Networks are responsible for great expansions in the area of technological access. For example, a company may use a network to link many cheaper, less powerful computers to a few expensive, very powerful computers. In so doing, the less powerful computers are able to do a greater variety of work.

In another example, a company may use a telephone network to link many telephones within a company or area to a specific call center. In so doing, a much more efficient utilization of bandwidth, telephone line space, and incoming and outgoing calls may be realized. Additionally, the individual telephones may be able to utilize a multiplicity of different programming and/or dialing options that may not be available for a single telephone operating on a dedicated telephone line.

Due to the many benefits of a network environment, many companies rely heavily on them. With such a reliance upon networks and networking capabilities, a need to maintain a quality network with high reliability factors is paramount in any workplace or industry. In fact, most companies are dependent on a solidly structured network system. In order to ensure proper upkeep of the network, sensors are utilized in conjunction with warning alarms to alert a system administrator to an error within the network or within a device on the network.

One method for signaling an error or possible error is the utilization of light emitting diodes (LEDs). For example, if a device, a network, or a device monitoring the network is running without error, a green LED may be displayed. However, if a minor fault or error (e.g., periodic maintenance, device with a backup, etc.) that is not critical is sensed, a yellow LED may be displayed. Furthermore, if the error or fault is critical, a red LED may be displayed.

One disadvantage of a visual error signaling format in general, and LED status lights in particular, is the proximity a system administrator must establish in order to observe the signal. For example, if a device or network is in a server room, closet, store room, or the like, a system administrator or technician may be required to search the crowded spaces in order to ensure correct operation or to find an occurring error. In addition, due to the need for a system administrator to access the devices and specifically see the LEDs, the best use of space may not be possible. For example, room must be left between devices to ensure the visibility of each LED.

A further disadvantage of visual error signals is troubleshooting costs. Specifically, if a network or device within the network fails, the network manager must then apply both time and personnel to resolve the problem. For example, a network technician may take considerable time troubleshooting a network crash, resulting in possible network downtime and troubleshooting costs. In order to resolve the issue, the technician may have to debug the network by checking each LED on the entire system. This type of network debugging often takes considerable time to resolve, thus costing the network users and owners a large amount of money in lost productivity alone.

In order to overcome the deficiencies of the above stated LED indicators, many network system administrators and providers have established audio signals. For example, if a device, a network, or a device monitoring the network is running without error no noise is made. However, if an error or fault is occurring a noise may be emitted by the device, network, or device monitoring the network. Therefore, instead of needing to see the error indicators, a technician need only listen for the audio signal and follow the sound to the source.

Although the above stated solution further enhances network troubleshooting and establishes a much more efficient means of debugging a network, a technician must still monitor the system and track any errors using one or more of his senses. Thus, the network maintains the deleterious requirements of a staff of technicians maintaining constant monitoring of the network and the associated costs.

SUMMARY OF INVENTION

The present invention provides, in various embodiments, a method and system for signaling a system fault. The present invention further provides a method and system for signaling a system fault which can be sent directly to a communications device. Additionally, the present invention provides a method and system for signaling a system fault which delivers the signal in audio or text format. The present invention further provides a method and system for signaling a system fault which is compatible with existing network technology.

In one method embodiment, the present invention receives an error advisory pertaining to a fault within a network. Next, the present invention selects a pre-programmed alert message from a database based on the error advisory, wherein the pre-programmed alert message is selected from a plurality of pre-programmed alert messages stored in the database. The present invention then transmits the pre-programmed alert message to a communications device.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 4 is a block diagram of an exemplary database table in accordance with one embodiment of the present invention.

Figure 1:
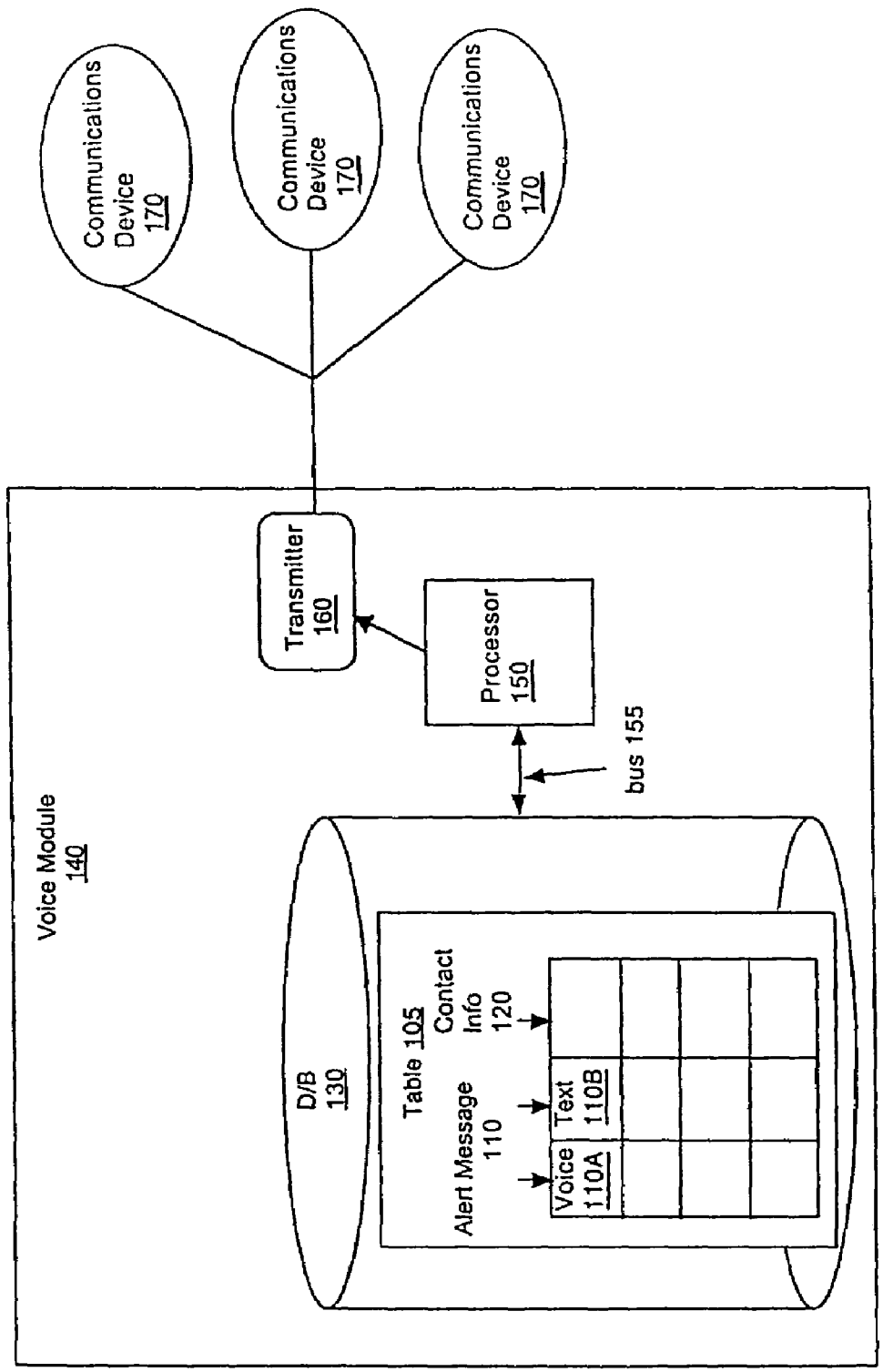
FIG. 1 is a block diagram of an exemplary computing system for signaling a system fault in accordance with one embodiment of the present invention.

The drawings referred to in this description should be understood as not being drawn to scale except if specifically noted.

DESCRIPTION OF THE PREFERRED EMBODIMENTS

In the following detailed description of the present invention, a method and system for signaling a system fault, specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Some portions of the detailed descriptions that follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those that require physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "initiating", "transmitting", "resolving", "processing" or the like, refer to the action and processes of a computer system (e.g., FIG. 6), or similar electronic computing device, that manipulates and transforms data represented as physical (electronic) quantities within the computer system's registers and memories into other data similarly represented as physical quantities within the computer system memories or registers or other such information storage, transmission or display devices.

In one embodiment, the present invention described herein is utilized for signaling a system fault without requiring an administrative support branch in the vicinity of the system equipment. Instead, a device within the system is used to contact a communications device outside the system (for example, a telephone, a mobile telephone, a pager, a personal digital assistant (PDA), and the like), which is designated as a contact point for an administrative support technician. Thus, a communication may be generated with an announcement and/or American character standard (ASCII) message to identify the node and nature of the problem (e.g., a telephone call, a voice message, a text message, a page, an e-mail, or the like). In one embodiment, contact information may be found in a table based on a provisional 24-hour seven day a week schedule with different communications devices being contacted depending on the day, time, type of alert, or the like. Therefore, a technician or administrative person may be contacted based on a pre-programmed selection method maintained in a database.

With reference now to FIG. 1, a block diagram of an exemplary voice module 140 for signaling a system fault is shown in accordance with one embodiment of the present invention. Voice module 140 includes processor 150, database 130, table 105, transmitter 160, and bus 155. Outside of voice module 140 are communications devices 170 that are discussed in more detail herein. Although voice module 140 is depicted as a single device, embodiments of the present invention are well suited for use on a multiplicity of devices and/or databases having a number of distinct components (e.g., components 101–160), such as, for example, a network or chassis.

In one embodiment, voice module 140 may detect an error or receive an error advisory. The error may be detected within a device, or within a network to which the device is connected, or reported to voice module 140 from a separate device within the network. For example, the detected error or error advisory may be based on a partial fault (e.g., T1 line is not operating correctly, E1 line is not operating correctly, a problem with a gateway, a router error, a switch error, or the like) or a total fault (e.g., a bad chip, a loss of signal, a loss of contact, electrical failure, or the like).

With reference still to FIG. 1, in one embodiment, database 130 may be hard coded, or may contain a reprogrammable table such as table 105. Furthermore, database 130 may be stored on a cache, a hard drive, a flash memory, or the like. In one embodiment, table 105 contains a plurality of alert messages 110 and contact information 120. For example, table 105 may contain alert messages 110 that range from general maintenance warnings that may not be time critical, to alert messages 110 that are extremely time sensitive. Furthermore, alert messages 110 may be voice alert messages 110A or text alert messages 110B. Further description of alert messages 110 are covered in more detail herein. In one embodiment, contact information 120 may contain information based on the type of error, the time sensitive nature of the error, the schedule of the technical staff, or the like, which may vary on a monthly, weekly, daily, and/or hourly basis.

In one embodiment, voice module 140 may be a device capable of generating a call. For example, voice module 140 may access a T1 line and induce a local off-hook condition (e.g., simulating an alert agent that normally provides the dial tone to the voice module 140). Once the off-hook condition is induced, voice module 140 may place a call to the selected communications device 170 simply by dialing the number. In one embodiment, voice module 140 may have a voice card with announcement capabilities. Therefore, if a voice alert message 110A is desired, after the off-hook condition is induced and the selected communications device 170 is reached, voice module 140 may play voice alert messages 110A to communications device 170.

In one embodiment, voice module 140 may be a voice interworking service module (VISM).

Transmitter 160 may be a processor switching module (PXM), serial communication port, a Universal Serial Bus (USB), an Ethernet adapter, a FireWire® (IEEE 1394) interface, a parallel port, a small computer system interface (SCSI) bus interface, infrared (IR) communication port, Bluetooth® wireless communication port, a broadband interface, or an interface to the Internet, among others.

Figure 2:
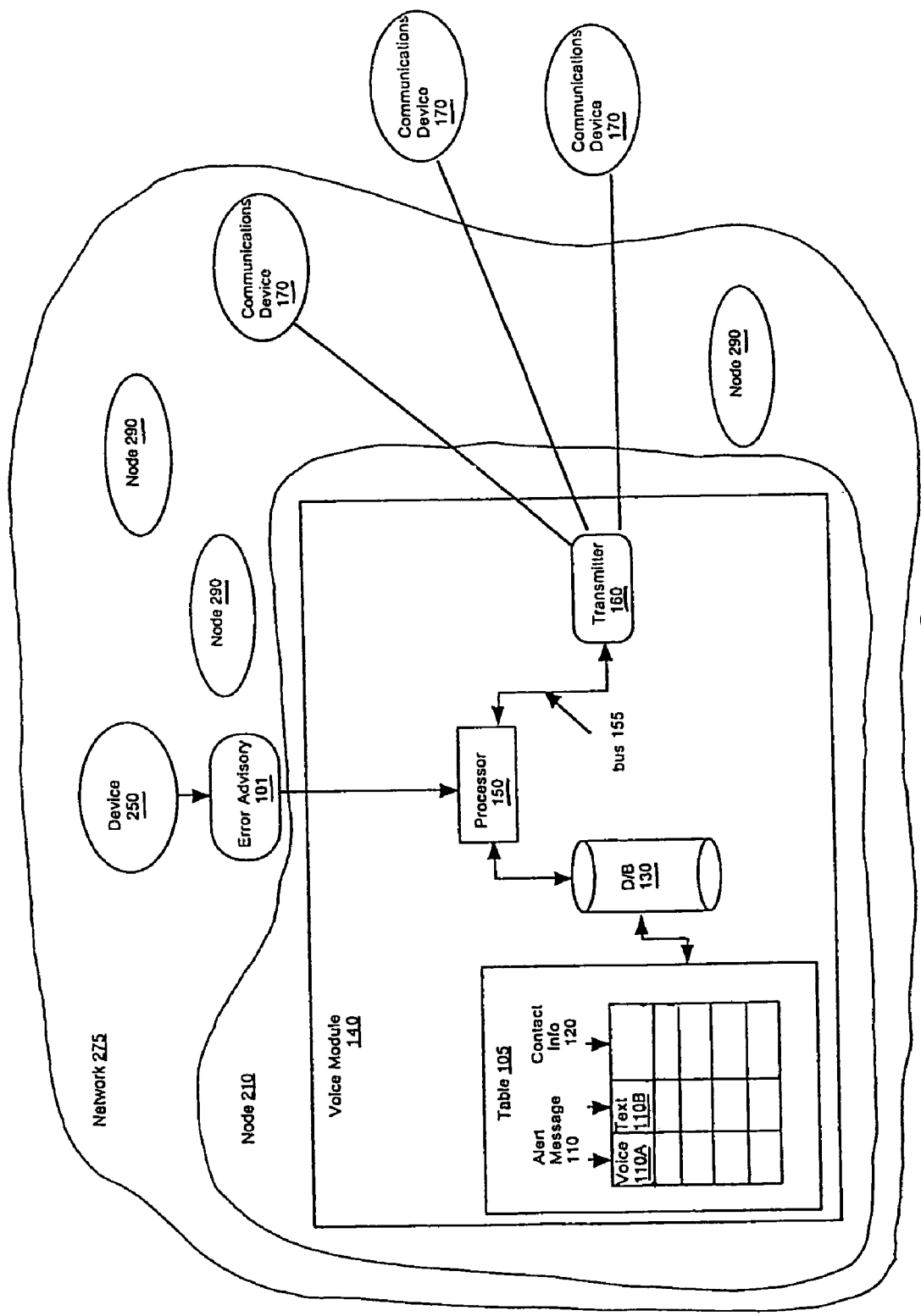
FIG. 2 is a block diagram of a system for signaling a system fault in a network in accordance with one embodiment of the present invention.

Referring now to FIG. 2, a block diagram of an exemplary embodiment of a network 275 comprising a node 210 for signaling a system fault is shown. In one embodiment, voice module 140 includes processor 150, database 130, table 105, transmitter 160, and bus 155. Outside of voice module 140 are communications devices 170, and nodes 290. It should be noted that the exemplary operation of voice module 140 is similar to the voice module of FIG. 1. However, in voice module 140 of FIG. 2, processor 150, database 130, table 105, and transmitter 160 are all within a single node 210 of network 275.

Included in network 275 are nodes 290, which may be similar in composition to node 210 (e.g., a node having a voice module) or may have a completely different purpose (e.g., a router or switch). In addition, in one embodiment, communications device 170 is within network 275. For example, if network 275 is a telephone network, communications device 170 may be a mobile phone within the network. In another embodiment, communications device 170 is outside of network 275. For example, if network 275 is an office network, communications device 170 may be a mobile phone carried by a technician outside of the office network.

Referring now to the exemplary operation of network 275, in one embodiment an error advisory 101 is received from a device 250 within network 275 and/or detected by processor 150. For example, error advisory 101 may be sent to processor 150 from a device 250 located within the same network 275 in which processor 150 is located. In another embodiment, error advisory 101 may be generated by processor 150 based on an error recognized by processor 150. For example, processor 150 may detect an internal error (e.g., an error within node 210), or processor 150 may detect an external error that is detrimentally effecting network 275 to which it is connected. In various embodiments, network 275 may be a local area network (LAN), wide area network (WAN), telecommunications network, Ethernet, wireless network, Internet, or the like, which can connect a single device or multiple devices.

Upon receipt of error advisory 101, processor 150 may access database 130 (e.g., table 105 within database 130) and select a pre-programmed alert message 110. As stated herein, the selection of pre-programmed alert message 110 may be based on the severity of the error advisory, the time of day, the type of communications device receiving the alert message, the personnel receiving the alert message, or the like. In addition to selecting alert message 110, processor 150 may also select the contact information 120 (for example, pager number or cell phone number).

Once selection of alert message 110 and contact information 120 have been established, processor 150 of voice module 140, is utilized to announce the alert message 110. For example, if processor 150 has selected voice as the medium for delivering alert message 110, then an audio message would be generated for delivery to communications device 170. The generated audio of voice module 140 is then transmitted to the specified communications device (or devices) 170 via transmitter 160 that is coupled to processor 150 via bus 155. Although a transmitter 160 is shown in the present embodiment, voice module 140 and/or processor 150 may include transmitting capabilities such as those of transmitter 160. The description of a separate transmitter 160 is merely for purposes of clarity.

In another embodiment, if a text alert message 110B (e.g., ASCII, numeric, alpha-numeric, alpha, digital tone, or the like) is selected instead of an audio alert message 110A, then processor 150 may utilize transmitter 160 to transmit the text alert message 110B to the specified communications device (or devices) 170.

Figure 3:
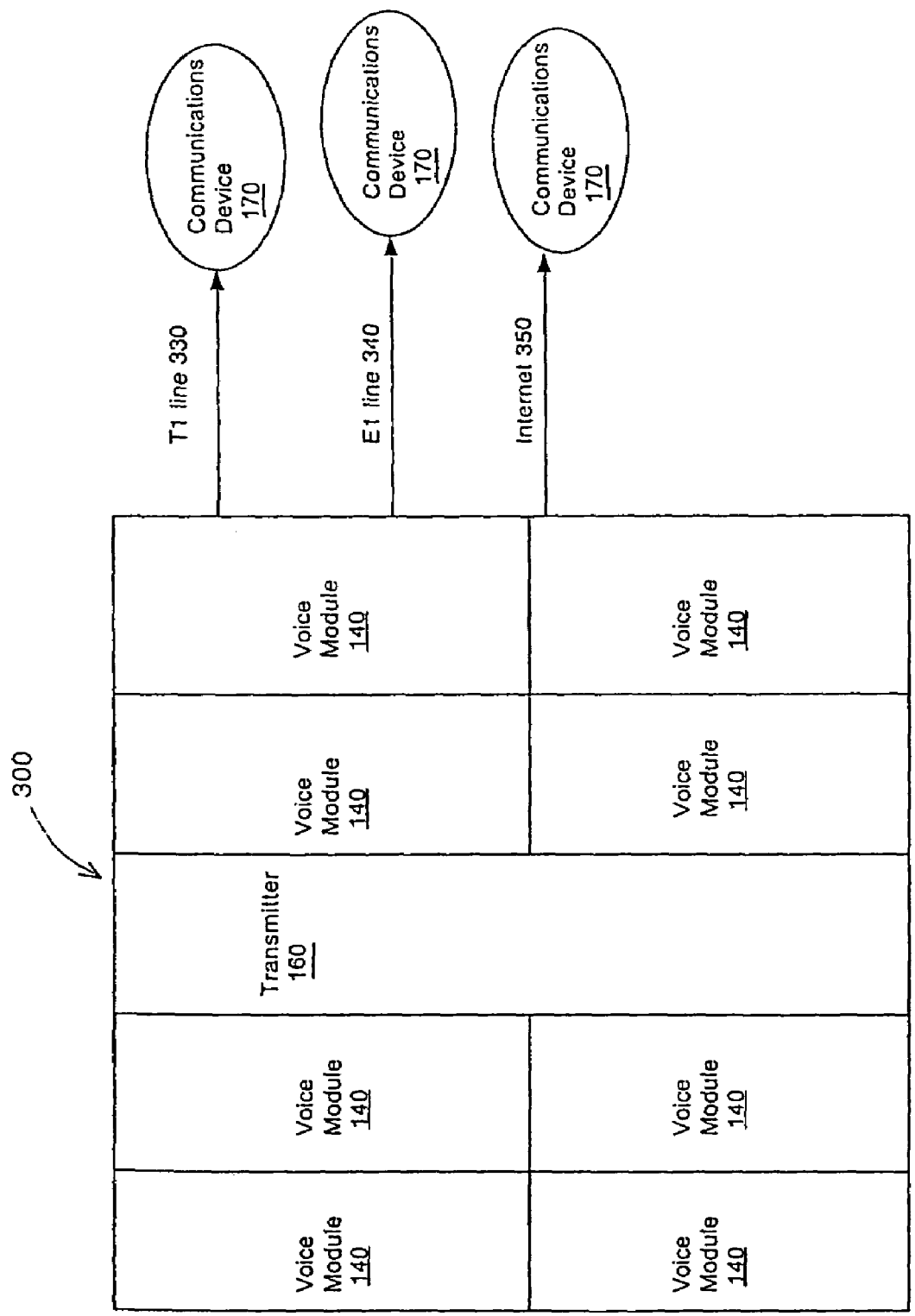
FIG. 3 is a block diagram of a network of devices for signaling a system fault in accordance with one embodiment of the present invention.

With reference now to FIG. 3, a block diagram of an exemplary embodiment of a network of devices for signaling a system fault is shown. Specifically, FIG. 3 shows a chassis 300 with a plurality of blades (e.g., voice modules 140 and transmitter 160) therein. Chassis 300 is one exemplary implementation of the systems described herein (e.g., voice module 140 of FIG. 1 and network 275 of FIG. 2) with transmitter 160 (e.g., a processor switching module (PXM)) acting as a motherboard. In one embodiment, chassis 300 may have 32 slots, 1 through 16 on the top and 17–32 on the bottom. Included in chassis 300 may be a plurality of voice modules 140 shown as half height trays. Although voice modules 140 are shown as half height trays, they may be full height trays. Each voice module 140 may include up to eight T1 or E1 lines. In addition, each T1 line may have 192 telephone channels. In one embodiment, voice module 140 may be a VISM.

In normal operation chassis 300 may be a telephony network wherein user telephone lines are connected to a voice module 140 (e.g., VISM), and converted from digital channel content to a packet and then sent to transmitter 160 (e.g., PXM) and sent out over a network connection, T1 line 330, E1 line 340, Internet 350, or the like. In one embodiment, when a fault is detected within chassis 300 (e.g., by voice module 140), a call is generated (based on a look up table, e.g., table 105 of FIGS. 1 and 2) to a communications device 170 (e.g., to an administrator). Included in the call is a detailed description of the fault (e.g., which card, which shelf, which T1 line, which E1 line, or the like). Once a connection to a communications device 170 is made, the voice module 140 will play the announcement. In one embodiment, the voice module 140 may further include an auto repeat function, redial, or the like, which may be utilized in a random or systematic fashion until the error is recognized and/or resolved.

With reference now to FIG. 4, a block diagram of an exemplary database table 105 is shown in accordance with one embodiment of the present invention. Specifically, FIG. 4 is a detailed version of one of many possible embodiments for table 105. In table 105 of FIG. 4, both alert message 110 and contact information 120 are broken down into three categories. Alert message 110 includes time of day 410, error type 420, and message 430. While contact information 120 includes communications device 440, number of retries 450, and duration 460. Although a specific version of table 105 is shown in FIG. 4, it is appreciated that there are a plurality of categories that may be added or removed from table 105. The categories described herein are merely for purposes of brevity and clarity.

With reference still to table 105 of FIG. 4, in one embodiment when an error advisory is received, table 105 is accessed to select the desired content of alert message 110. For example, the content of message 430 is selected by first inputting the time of day 410 (or day of week, or week of month, or month of year, etc.) the error occurred. Once the time of day 410 is established, the error type 420 is chosen (e.g., partial error, total malfunction, etc.). Thus, from within the row based on time of day 410 and error type 420 the content of message 430 may be selected.

Once the content of message 430 is selected, the communications device 170 for receiving message 430 is selected from the communications device 440 column. Included in the information stored in the communications device 440 column may be the type of communications device 170 and access information for communications device 170 (e.g., telephone number (or numbers) for communications device 170, e-mail address (or addresses) for communications device 170, codes to be entered after accessing the communications device 170, and the like). The selection of the type of communications device 170 allows voice module 140 to appropriately format the content of message 430 (e.g., audio, text, ASCII, etc.) such that it is compatible with communications device 170 (of FIGS. 1 and 2). In addition to the type and access information for communications device 440, the number of retries 450 and duration of wait time 460 between retries is also provided. For example, if communications device 170 is a pager that is busy then the retry time may be shorter than if communications device 170 is a PDA with e-mail capabilities.

Figure 5:
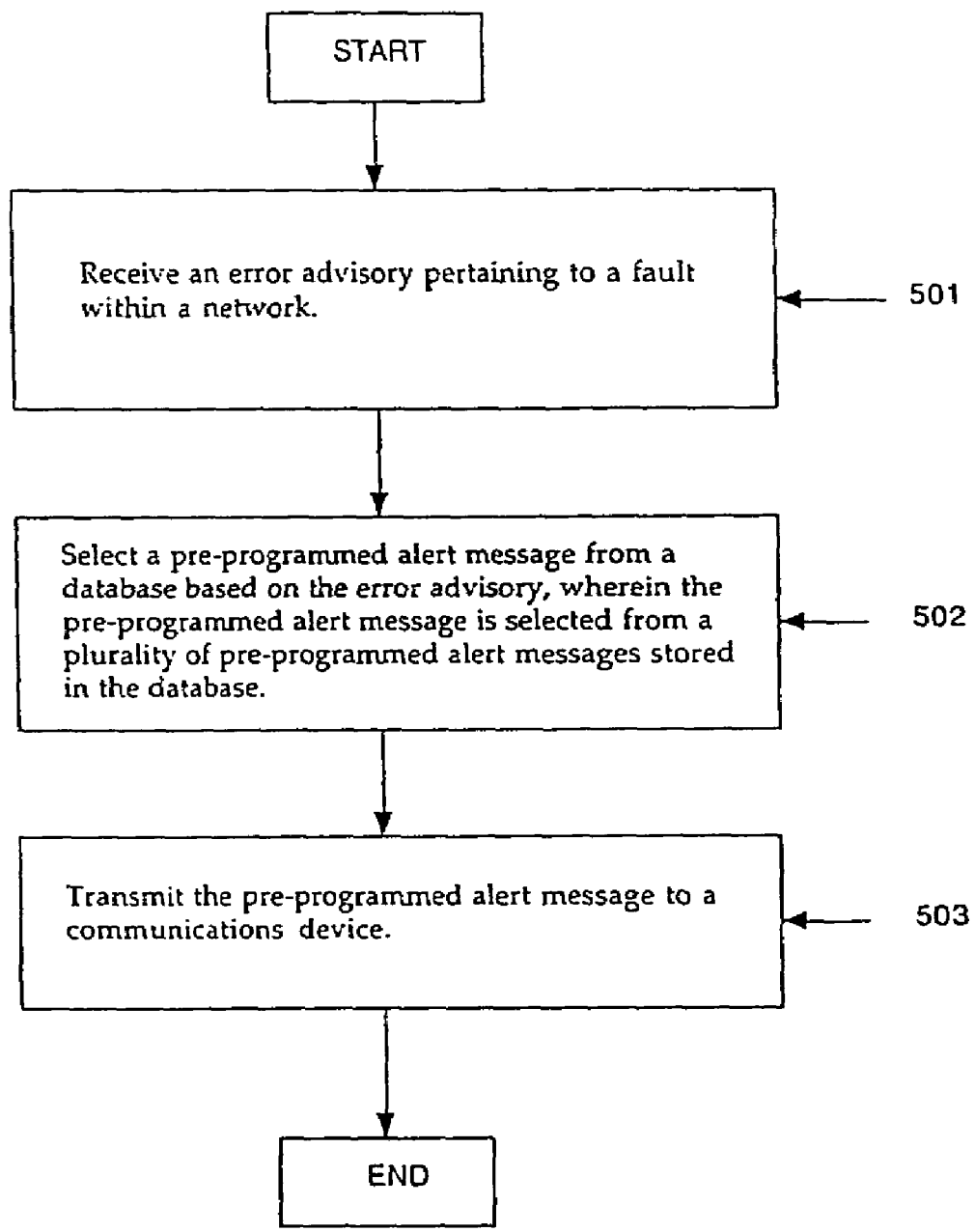
FIG. 5 is a flowchart of steps in an exemplary method for signaling a system fault in accordance with one embodiment of the present invention.

With reference now to FIG. 5, flowchart 500 is an illustration of the exemplary steps used by an embodiment of the present invention. FIG. 5 includes process 500 of the present invention which, in one embodiment, is carried out by a processor under the control of computer-readable and computer-executable instructions. The computer-readable and computer-executable instructions reside, for example, in data storage features such as computer usable volatile memory 604, computer usable non-volatile memory 606, and/or data storage device 130 of FIG. 6. The computer-readable and computer-executable instructions are used to control or operate in conjunction with, for example, central processing unit 150 of FIG. 6.

Referring now to step 501 of FIG. 5 and FIG. 2, in one embodiment an error advisory 101 is received from a device 250 within a network 275. As stated herein, error advisory 101 may be received by processor 150 and/or voice module 140. The reception of error advisory 101 from device 250 within network 275 may be the result of an internal diagnostic from device 250 within network 275, or due to an attempt to access a non-responsiveness component within network 275 (e.g., a T1 line which is not responding, a bus error, a chip malfunction, router/switch error, power fluctuations, or the like which may deleteriously effect network 275 or device 250 operations). In addition, error advisory 101 may be detected by processor 150 and/or voice module 140. For example, error advisory 101 may be self-diagnosed by processor 150 or voice module 140 based on the malfunction of software or hardware components located therein. Furthermore, error advisory 101 may be self-diagnosed by processor 150 or voice module 140 based on the malfunction or non-responsiveness of software or hardware components located on the network 275.

With reference now to step 502 of FIG. 5 and FIG. 2, in one embodiment a pre-programmed alert message 110 is selected from a database 130 based on the error advisory 101, wherein the pre-programmed alert message 110 is selected from a plurality of pre-programmed alert messages 110 stored in database 130. As stated herein, the selection criteria may comprise time of day, type of error, seriousness of error, communications device selected to receive the alert message, or the like.

Referring now to step 503 of FIG. 5 and FIG. 2, in one embodiment pre-programmed alert message 110 is transmitted to a communications device 170. In one embodiment, communications device 170 is outside node 210 but inside network 275. In another embodiment, communications device 170 is completely outside of network 275. As stated herein, the transmission may be done by processor 150, voice module 140, and/or transmitter 160. In addition, the transmission may be repeated based on resolution of the error. For example, if a busy signal is detected during a telephone transmission, a number of retries and duration of time between retries may be specified. Thus, if the set number of retries is reached without any feedback (e.g., no resolution, no recognition, no connection established, etc.), a different set of contact information may be selected from table 105. This course of action may be repeated until a call is completed, and/or resolution of the error is established.

Figure 6:
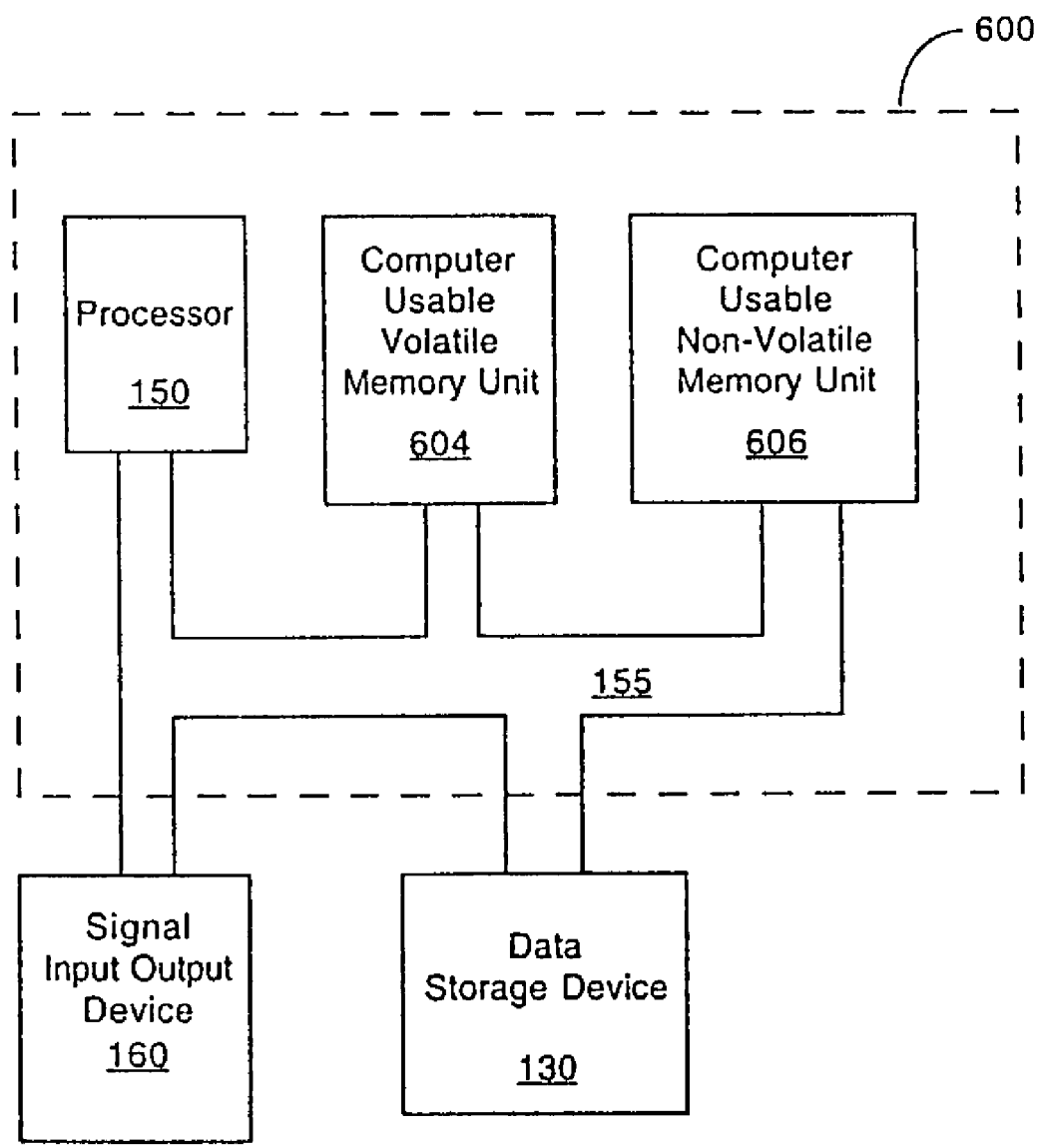
FIG. 6 is a block diagram of exemplary circuitry of a computing system that may be used as a platform to implement embodiments of the present invention.

FIG. 6 illustrates a block diagram of an exemplary computer system 600 used in accordance with embodiments of the present invention. System 600 of the present embodiment is well suited to be any type of computing device (e.g., server computer, portable computing device, desktop computer, etc.). Within the discussions of embodiments of the present invention, certain processes and steps are discussed that are realized, in one embodiment, as a series of instructions (e.g., software program) that reside within computer readable memory units of computer system 600 and executed by a processor(s) of system 600. When executed, the instructions cause computer 600 to perform specific actions and exhibit specific behavior that is described in detail herein.

Computer system 600 of FIG. 6 comprises an address/data bus 155 for communicating information, one or more central processors 150 coupled with bus 155 for processing information and instructions. Central processor unit(s) 150 may be a microprocessor or any other type of processor. The computer 600 also includes data storage features such as a computer usable volatile memory unit 604 (e.g., random access memory, static RAM, dynamic RAM, etc.) coupled with bus 155 for storing information and instructions for central processor(s) 150, a computer usable non-volatile memory unit 606 (e.g., read only memory, programmable ROM, flash memory, EPROM, EEPROM, etc.) coupled with bus 155 for storing static information and instructions for processor(s) 150. System 600 also includes one or more signal generating and receiving devices 160 coupled with bus 155 for enabling system 600 to interface with other electronic devices and computer systems. The communication interface(s) 160 of the present embodiment may include wired and/or wireless communication technology. For example, within the present embodiment, the communication interface 160 may be a serial communication port, a Universal Serial Bus (USB), an Ethernet adapter, a FireWire (IEEE 1394) interface, a parallel port, a small computer system interface (SCSI) bus interface, infrared (IR) communication port, Bluetooth wireless communication port, a broadband interface, or an interface to the Internet, among others.

The system 600 of FIG. 6 may also include one or more optional computer usable data storage devices 130 such as a magnetic or optical disk and disk drive (e.g., hard drive or floppy diskette) coupled with bus 155 for storing information and instructions.

Thus, the present invention provides, in various embodiments, a method and system for signaling a system fault. The present invention further provides a method and system for signaling a system fault which can be sent directly to a communications device. Additionally, the present invention provides a method and system for signaling a system fault which delivers the signal in audio or text format. The present invention further provides a method and system for signaling a system fault which is compatible with existing network technology.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the Claims appended hereto and their equivalents.

What is claimed is:

1. A method comprising:
   receiving an error advisory pertaining to a fault within a network;
   selecting a pre-programmed alert message from a database based on said error advisory, wherein said pre-programmed alert message is selected from a plurality of pre-programmed alert messages stored in said database;
   selecting from said database a first communications device for receiving said pre-programmed alert message, said first communications device is associated with a number of retries within said database, and wherein said first communications device communicates via a first communications channel; and
   if said number of retries is reached while trying to establish a connection with said first communications device, selecting from said database a second communications device for receiving said pre-programmed alert message, wherein said second communications device communicates via a second communications channel, and wherein said second communications channel utilizes communications technologies different from said first communications channel.

2. The method as recited in claim 1, wherein said error advisory is received from a device within a network.

3. The method as recited in claim 1 wherein said second communications device is outside of said network.

4. The method as recited in claim 1, further comprising:
   receiving said error advisory at a voice interworking service module (VISM) having voice announcement capabilities.

5. The method as recited in claim 1, further comprising:
   transferring said pre-programmed alert message from said database to a voice interworking service module (VISM) having voice announcement capabilities.

6. The method as recited in claim 1, further comprising:
   transmitting said pre-programmed alert message to said second communications device utilizing a processor switching module (PXM).

7. The method as recited in claim 1, wherein each of said first and second communications devices is selected from the group consisting of a telephone, a mobile phone, a pager, and a personal digital assistant (PDA).

8. The method as recited in claim 1, wherein said selecting from said database said first communications device based on the time of day said error advisory is received.

9. The method as recited in claim 1, further comprising:
   transmitting said pre-programmed alert message in an audio format to said second communications device.

10. The method as recited in claim 1, further comprising:
    transmitting said pre-programmed alert message in a text format to said second communications device.

11. The method as recited in claim 1, wherein said error advisory is selected from the group consisting of a T1 line not operating correctly, an E1 line not operating correctly, a problem with a gateway, a router error, a switch error, a bad chip, electrical fluctuations, and a loss of signal.

12. A system comprising:
    a device able to detect an error; and
    a database for storing a plurality of pre-programmed alert messages and contact information for a plurality of communications devices, wherein said contact information comprises a number of retries associated with trying to establish a connection with each of said plurality of communications devices;
    wherein upon detection of said error, said device selects one of said plurality of pre-programmed alert messages stored on said database, and transmits said pre-programmed alert message to a first communications device of said plurality of communications devices that communicates via a first communications channel, and wherein if said number of retries is reached while trying to establish a connection with said first communications device, then said pre-programmed alert message is transmitted to a second communications device that communicates via a second communications channel that utilizes communications technologies different from said first communications channel.

13. The system of claim 12, wherein said device further comprises one or more network interfaces.

14. The system of claim 12, wherein said device is further able to receive an error advisory, select one of said plurality of pre-programmed alert messages stored on said database, and transmits said pre-programmed alert message to a communications device of said plurality of communications devices.

15. The system of claim 12, wherein said device is a voice module having a voice card with announcement capabilities and is capable of generating a communication or sending text.

16. The system of claim 12, wherein said device selects one of said plurality of pre-programmed alert messages stored on said database based on the severity of said error detected or said error advisory received.

17. The system of claim 12, wherein said communications device is selected from the group consisting of a telephone, a mobile phone, a pager, and a personal digital assistant (PDA).

18. The system of claim 12, wherein said pre-programmed alert message is transmitted by said device in either an audio or a text format based on the type of said communications device.

19. The system of claim 12, wherein said error is selected from the group consisting of a T1 line not operating correctly, an E1 line not operating correctly, a problem with a gateway, a router error, a switch error, a bad chip, electrical fluctuations, and a loss of signal.

20. A computer system comprising:
    a bus;
    a memory unit coupled to said bus; and
    a processor coupled to said bus, said processor for signaling a system fault comprising:
    detecting an error or receiving an error advisory from a device within a network, wherein said error is detected or said error advisory is received by a voice module having voice announcement capabilities;

selecting a pre-programmed alert message from a database, wherein said pre-programmed alert message is selected by said voice module from a plurality of pre-programmed alert messages stored on said database based on said error advisory;

choosing a first communications device from said database for receiving said pre-programmed alert message, wherein said first communications device is chosen from a plurality of pre-programmed contact information stored on said database based on the time of day said error is detected or said error advisory is received database, said plurality of pre-programmed contact information comprises a number of retries associated with trying to establish a connection with said first communications device; and transmitting said pre-programmed alert message via a first communications channel to said first communications device, wherein said pre-programmed alert message is transmitted in either an audio format or a text format to said first communications device, and wherein if said transmission to said communications device over said first communications channel fails, said pre-programmed alert message is transmitted via a second communications channel to a second communications device, wherein said second communications channel utilizes communications technologies different from said first communications channel.

21. The computer system of claim 20, wherein said network further comprises:

a node having a VISM and a processor switching module (PXM).

22. The computer system of claim 21, wherein said error is detected at the node.

23. The computer system of claim 21, wherein said error is occurring at another node or between nodes.

24. The computer system of claim 20, wherein said communications device is selected from the group consisting of telephone, mobile phone, pager, and personal digital assistant (PDA).

25. The computer system of claim 20, wherein said pre-programmed alert message is transmitted in either an audio or a text format based on the type of said communications device.

26. The computer system of claim 20, wherein said error or said error advisory is selected from the group consisting of a T1 line not operating correctly, an E1 line not operating correctly, a problem with a gateway, a router error, a switch error, a bad chip, electrical fluctuations, and a loss of signal.

27. A means for signaling a system fault comprising:

a means for detecting an error or receiving an error advisory; and a means for storing a plurality of pre-programmed alert messages and contact information for a communications device, wherein said contact information comprises a number of retries associated with trying to establish a connection with said communications device;

wherein upon detection of said error or reception of said error advisory, said means selects one of said plurality of pre-programmed alert messages stored on said database, and transmits said pre-programmed alert message to said first communications device, wherein said first communications device communicates via a first communications channel, and wherein if said number of retries is reached while trying to establish a connection with said first communications device, then said pre-programmed alert message is transmitted to a second communications device that communicates via a second communications channel that utilizes communications technologies different from said first communications channel.

28. The means for signaling a system fault as described in claim 27, wherein said means for detecting is capable of generating a call and has a voice card with announcement capabilities.

29. The means for signaling a system fault as described in claim 27, wherein said communications device is selected from the group consisting of a telephone, a mobile phone, a pager, and a personal digital assistant (PDA).

30. The means for signaling a system fault as described in claim 27, wherein said error or said error advisory is selected from the group consisting of a T1 line not operating correctly, an E1 line not operating correctly, a problem with a gateway, a router error, a switch error, a bad chip, electrical fluctuations, and a loss of signal.

* * * * *

UNITED STATES PATENT AND TRADEMARK OFFICE
CERTIFICATE OF CORRECTION

| | |
|---|---|
| PATENT NO. | : 7,185,221 B1 |
| APPLICATION NO. | : 10/187882 |
| DATED | : February 27, 2007 |
| INVENTOR(S) | : Wael Kamel |

It is certified that error appears in the above-identified patent and that said Letters Patent is hereby corrected as shown below:

TITLE PAGE, ITEM (73) Assignee, should read:

Assignee: Cisco Technology, Inc.

San Jose, California

Signed and Sealed this

Second Day of October, 2007

JON W. DUDAS
*Director of the United States Patent and Trademark Office*